United States Patent
Schechter et al.

(10) Patent No.: US 10,390,605 B1
(45) Date of Patent: Aug. 27, 2019

(54) GROOMING BRUSH

(71) Applicant: ANIPURE PET PRODUCTS INC., New York, NY (US)

(72) Inventors: Pamela Schechter, New York, NY (US); Elizabeth Schechter, New York, NY (US); Mary Fitzgerald, New York, NY (US)

(73) Assignee: ANIPURE PET PRODUCTS INC., New York, NY (US)

( * ) Notice: Subject to any disclaimer, the term of this patent is extended or adjusted under 35 U.S.C. 154(b) by 368 days.

(21) Appl. No.: 15/440,496

(22) Filed: Feb. 23, 2017

Related U.S. Application Data

(60) Provisional application No. 62/301,131, filed on Feb. 29, 2016.

(51) Int. Cl.
| | |
|---|---|
| *A01K 13/00* | (2006.01) |
| *A46B 5/00* | (2006.01) |
| *A46B 9/02* | (2006.01) |
| *A46B 7/04* | (2006.01) |
| *A46D 3/00* | (2006.01) |

(52) U.S. Cl.
CPC .......... *A46B 5/0037* (2013.01); *A01K 13/002* (2013.01); *A46B 5/0029* (2013.01); *A46B 7/04* (2013.01); *A46B 9/023* (2013.01); *A46B 9/028* (2013.01); *A46D 3/00* (2013.01); *A46B 2200/104* (2013.01); *A46B 2200/1093* (2013.01)

(58) Field of Classification Search
CPC ........... A46B 7/04; A46B 9/023; A46B 9/028; A46B 5/0037
See application file for complete search history.

(56) References Cited

U.S. PATENT DOCUMENTS

| | | | | |
|---|---|---|---|---|
| 893,242 | A * | 7/1908 | Homeier | A45D 24/04 132/154 |
| 4,507,818 | A * | 4/1985 | Perdiz | A46B 7/026 15/203 |
| 5,398,366 | A * | 3/1995 | Bradley | A46B 7/06 15/167.1 |
| 5,427,120 | A * | 6/1995 | Wong | A45D 19/02 132/120 |
| 5,435,032 | A * | 7/1995 | McDougall | A46B 7/06 15/201 |
| 6,092,256 | A * | 7/2000 | Chen | A46B 7/00 132/120 |
| 7,500,282 | B1 * | 3/2009 | Park | A47K 7/02 15/160 |

(Continued)

*Primary Examiner* — Michael D Jennings
(74) *Attorney, Agent, or Firm* — R. Neil Sudol; Henry D. Coleman

(57) ABSTRACT

A hair brush for use on animals or people has a planar base member with two major faces, the base member being formed with a plurality of shallow recesses on one of the faces. Two of the recesses are spaced from one another by an elongate area, and the base member is formed with at least one elongate groove on the other of the major faces of the base member. The groove is opposed to and parallel with the elongate area. Plural bristle plates are seated in respective recesses in the base member, each bristle plate exhibiting a multiplicity of prongs or tines. The bristle plates are substantially rigid at room temperature, while the base member is made of a material substantially more flexible at room temperature than the bristle plates.

10 Claims, 7 Drawing Sheets

(56) References Cited

U.S. PATENT DOCUMENTS

| | | | | |
|---|---|---|---|---|
| 7,526,829 B2* | 5/2009 | Chang | ............... | A46B 17/06 132/119 |
| 8,397,336 B2* | 3/2013 | Park | ............... | A45D 20/12 15/160 |
| 8,533,894 B2* | 9/2013 | Watanabe | ............... | A45D 19/02 15/186 |
| 8,627,537 B2* | 1/2014 | Mercier | ............... | A46B 9/02 15/160 |
| 2005/0138745 A1* | 6/2005 | Huang | ............... | A46B 3/22 15/187 |
| 2005/0210614 A1* | 9/2005 | Chang | ............... | A46B 9/023 15/186 |
| 2015/0000609 A1* | 1/2015 | Frye | ............... | A01K 13/003 119/601 |
| 2015/0342335 A1* | 12/2015 | Nicoline | ............... | A46B 9/023 15/160 |
| 2016/0157593 A1* | 6/2016 | Sze | ............... | A46B 3/005 15/160 |

* cited by examiner

GROOMING BRUSH

BACKGROUND OF THE INVENTION

The present invention relates to a grooming tool particularly, but not exclusively for use on animals. More specifically, the invention relates to a hair or fur brush that is especially useful for grooming or brushing furry pets but may be used on other animals or even people.

Pet hair brushes are numerous and variegated. None appear to provide all of the desirable use and structure features. Such features include safety, both to the animal and to the user, ease of use, adaptability, and efficiency or effectiveness. It is desirable that a grooming product be capable of use so as to remove tangles and knots with few brush strokes and without unduly pulling on the animals fur.

Existing pet grooming devices include gloves with attached bristles, brushes with or without hand attachment straps or bands, brushes with perpendicular handles, brushes with soft bristles or pin bristles, random bristle arrays, etc.

OBJECTS OF THE INVENTION

It is an object of the present invention to provide an improved brush.

It is a more particular object of the present invention to provide a brush useful for animal care.

A further object of the present invention is to provide such a brush that is efficient in hair disentanglement and that, therefore, reduces or minimizes time needed to effectively eliminate tangles in an animal's fur.

Another object of the present invention is to provide such a brush that reduces, if not eliminates, injury to the animal due to the brushing process.

Yet another object of the present invention is to provide such a brush that is easy to use and that provides multiple use configurations.

These and other objects will be apparent from the drawings and descriptions herein. It is to be noted that while every object of the invention is achieved by at least one embodiment of the invention, there is not necessarily any single embodiment that achieves all of the objects of the invention.

SUMMARY OF THE INVENTION

The present invention is directed to a grooming tool particularly for brushing the hair of pets and is also directed to various component parts of such grooming tools. The brush may be used on people as well as animals other than pets.

A hair brush comprises, in accordance with the present invention, a planar base member having two major faces, the base member being formed with a plurality of shallow recesses on one of the faces. Two of the recesses are spaced from one another by an elongate area, and the base member is formed with at least one elongate groove or indentation on the other of the major faces of the base member. The groove is opposed to and parallel with the elongate area and facilitates bending of the base member about an axis parallel to the groove or indentation. The brush further comprises a plurality of bristle plates each mounted to the base member and seated in a respective one of the shallow recesses. Each of the bristle plates is provided along one major surface with a multiplicity of prongs or tines. The bodies of the bristle plates are substantially rigid at room temperature, while the base member is made of a material substantially more flexible at room temperature than the bristle plates. Preferably, the tines are at least partially flexible, particularly at their free ends.

The base member is capable of flexing under normal or moderate manually applied forces. More specifically, when a user holds the base member in a hand with the fingers engaging the base member on one side of the groove and the thumb engaging the base member on the other side of the groove, the user can deform the base member into a folded over configuration where two portions of the base member are nearly parallel to one another and the tines of one portion of the base member are interleaved or interdigitated with the tines of the other portion of the base member. This configuration of use is useful for removing tangles or knots in the hair of an animal or a person. Some users might also find the brush useful for untangling their own hair.

Pursuant to a particular embodiment of the present invention, the base member includes a medial portion bisected on the one of the faces by the elongate area and on the other of the faces by the groove or elongate indentation, the base member further including a pair of mutually spaced first triangular lobes at one end of the medial portion and a pair of mutually spaced second triangular lobes at an opposite end of the medial portion. The first triangular lobes are angled away from one another in a direction outwardly from the medial portion, and likewise the second triangular lobes are angled away from one another in a direction outwardly from the medial portion. The shallow recesses include four triangular recesses each disposed in a respective one of the first triangular lobes and second triangular lobes on the one of the major faces of the base member. The two recesses are medial recesses disposed on the medial portion of the base member on opposite sides of the elongate area, each of the medial recesses having a first linear edge juxtaposed to the elongate area and further having two shorter linear edges juxtaposed to respective ones of the four triangular recesses. The bristle plates include four triangular plates mounted to the base member and seated in respective ones of the triangular recesses.

The configuration of the hair brush may be mirror symmetric about the elongate area between the two medial recesses. Thus, each of the triangular lobes is juxtaposable in substantially parallel relationship with one of the other triangular lobes, allowing a more precise control by the user in removing tangles and knots. The triangular lobes may be additionally bendable towards one another. To that end, the base member exhibits, on the one major face, four additional elongate areas each disposed between a respective one of the shorter linear edges of the medial recesses and a respective one of the triangular recesses, and in addition the base member is further formed on the other major face with four additional grooves or elongate indentations each opposed to and parallel with a respective one of the four additional elongate areas.

It is to be noted that the brush can be used in a planar configuration for brushing and alternatively can be bent to conform to the animal's body for brushing. The bendability of the corners or triangular lobes makes it easier to reach the ears, whiskers and other parts of the animals' faces that are hard to reach with a normal brush or grooming tool.

Pursuant to another feature of the invention, the bristle plates are held in the respective recesses on the one major face of the base member by means of detents or lips each extending from the base member over an edge portion of a respective bristle plate.

Preferably, the bristle plates are made of a thermosetting material that is flexible in an elevated temperature range, generally significantly higher than room temperature, to enable insertion of the bristle plates into respective ones of the shallow recesses and under the detents or lips.

Pursuant to another feature of the present invention, at least some of the tines have substantially rigid base segments and flexible free end segments. The base segments are sufficiently rigid so as to not bend or deform during grooming or brushing, the free end segments being sufficiently flexible to freely bend and deform during grooming or brushing. The base segments may be thicker, with a larger diameter, than any portion of the free end segments. The tines may exhibit shoulders at junctions between the respective base segments and the respective distal or free end segments. Alternatively or additionally, the base segments may be made of a different material than that of the distal or free end segments.

According to another feature of the present invention, each of the triangular plates includes first tines all of a first length and second tines all of a second length less than the first length and a single third tine of a third length intermediate the first length and the second length. The third tine is located at an apex of the respective triangular plate. The first tines include a first linear array of mutually spaced tines spaced from the apex and a second linear array of mutually spaced tines disposed on a side of the first linear array of tines opposite the apex. The second tines include three straight rows of tines with a first row disposed between the third tine and the first linear array of mutually spaced tines, a second row disposed between the first linear array of mutually spaced tines and the second linear array of mutually spaced tines, and a third row on a side of the second linear array of mutually spaced tines opposite the apex.

Pursuant to another specific feature of the present invention, the bristle plates include two central bristle plates of generally triangular shape disposed adjacent and on opposite sides of the one elongate groove or indentation, each with a plurality of bristles or tines projecting from one side. The bristles or tines have respective lengths that are a first length, a second length less than the first length and a third length intermediate the first length and the second length. The bristles or tines are disposed in nine rows each extending parallel to a base edge of the triangular shape. The nine rows include (1) a first linear array of mutually spaced tines of the second length proximate the base edge, (2) a second linear array of mutually spaced tines of the third length on a side of the first linear array opposite the base edge, (3) a third linear array of mutually spaced tines of the first length on a side of the second linear array opposite the base edge, (4) a fourth linear array of mutually spaced tines of the second length on a side of the third linear array opposite the base edge, (5) a fifth linear array of mutually spaced tines of the first length on a side of the fourth linear array opposite the base edge, (6) a sixth linear array of mutually spaced tines of the second length on a side of the fifth linear array opposite the base edge, (7) a seventh linear array of mutually spaced tines of the first length on a side of the sixth linear array opposite the base edge, (8) an eighth linear array of mutually spaced tines of the second length on a side of the seventh linear array opposite the base edge, and (9) a ninth linear array of mutually spaced tines of the third length on a side of the seventh linear array opposite the base edge.

A method of manufacturing a hair brush comprises, in accordance with the present invention, molding a first thermosetting polymeric material to form a planar base member having two major faces, the base member having a plurality of shallow recesses on one of the faces, two of the recesses being spaced from one another by an elongate area raised relative to the two of the recesses, the base member having at least one elongate groove or elongate indentation on the other of the faces, the groove being opposed to and parallel with the elongate area. The method further comprises molding a second thermosetting polymeric material to form a plurality of flat bristle plates each having a plurality of bristles or tines projecting from one side. Each of the bristle plates is deformed while the bristle plates have an elevated temperature higher than room temperature. The deformed bristle plates are inserted into respective ones of the shallow recesses in the base member. Thereafter the bristle plates are allowed to resume flat or planar configurations while disposed in respective ones of the recesses. The bristle plates cool and assume a hardened configuration while lodged in the respective recesses.

A brush in accordance with the present invention, by virtue of the different lengths of teeth or tines facilitates separation of individual fur strands in a matte and thus enhances disentanglement. The soft or flexible ends of the tines prevent injury to the skin, while the firm tine base provides strength for ensuring hair separation. The effectiveness of the brush in disentangling fur strands reduces grooming times and alleviates undue stress on animal and handler.

DETAILED DESCRIPTION

Figure 1:
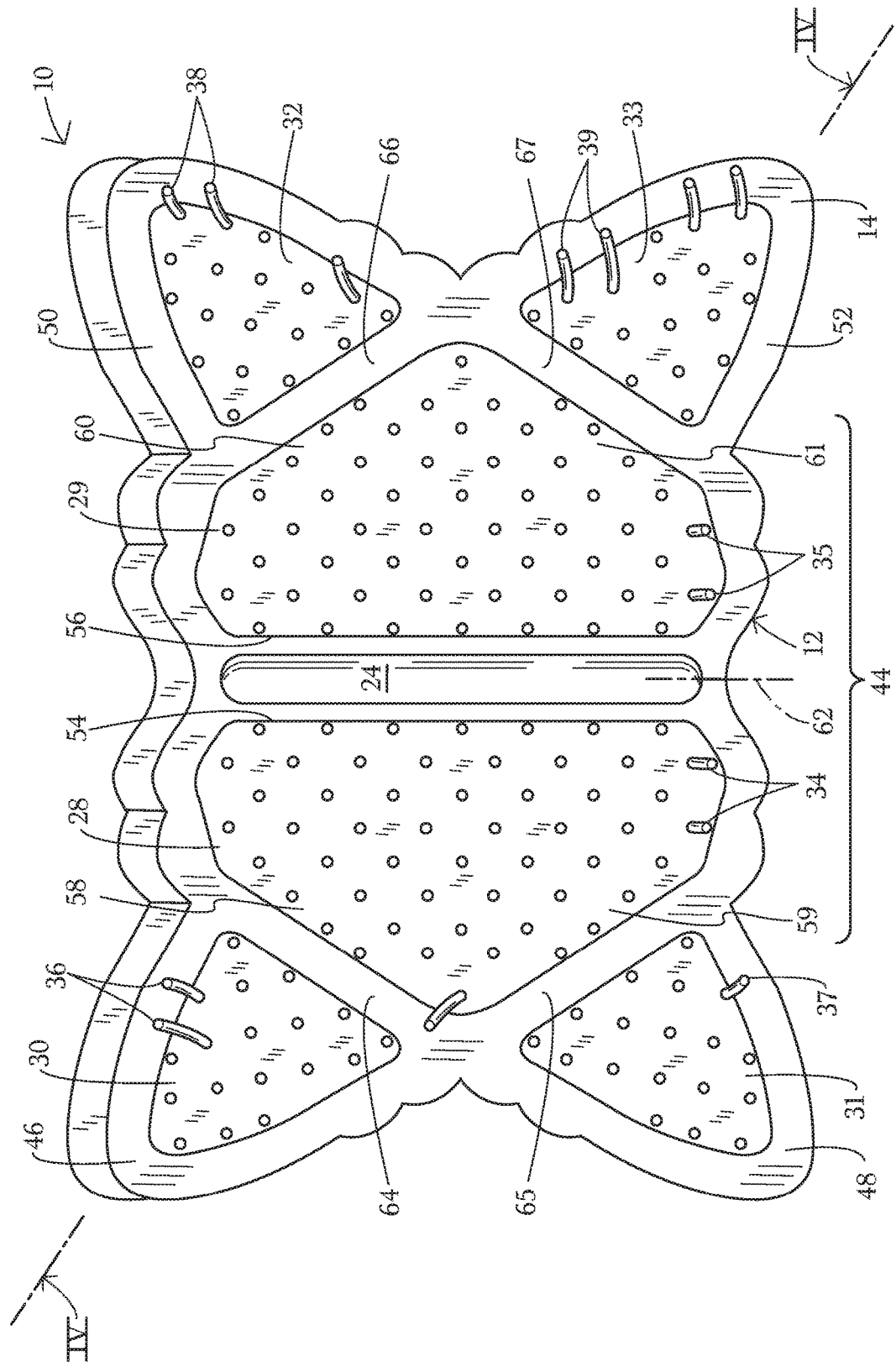
FIG. 1 is a top plan view of a grooming brush in accordance with the present invention.
Figure 2:
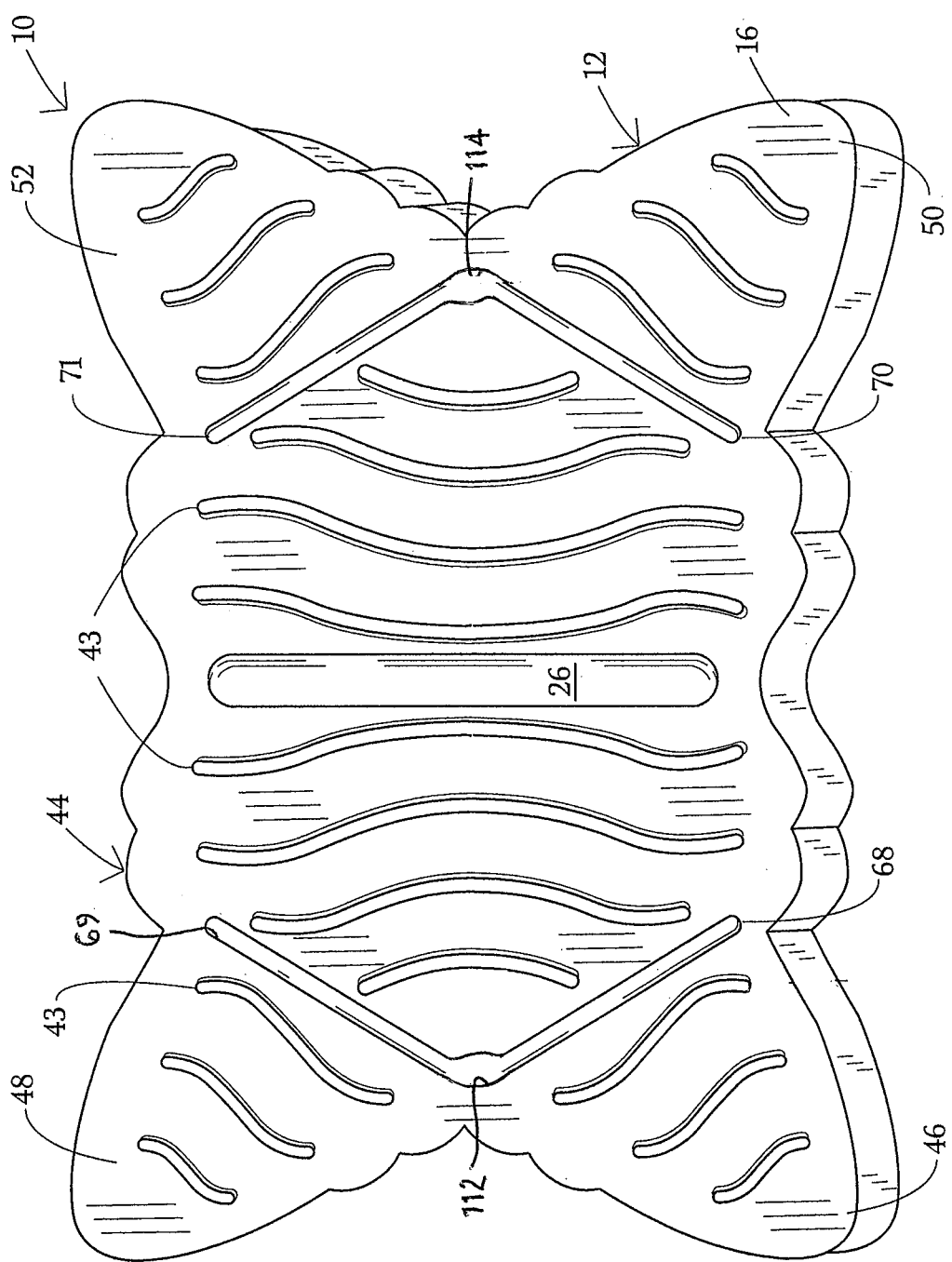
FIG. 2 is a bottom plan view of the grooming brush of FIG. 1.
Figure 3:
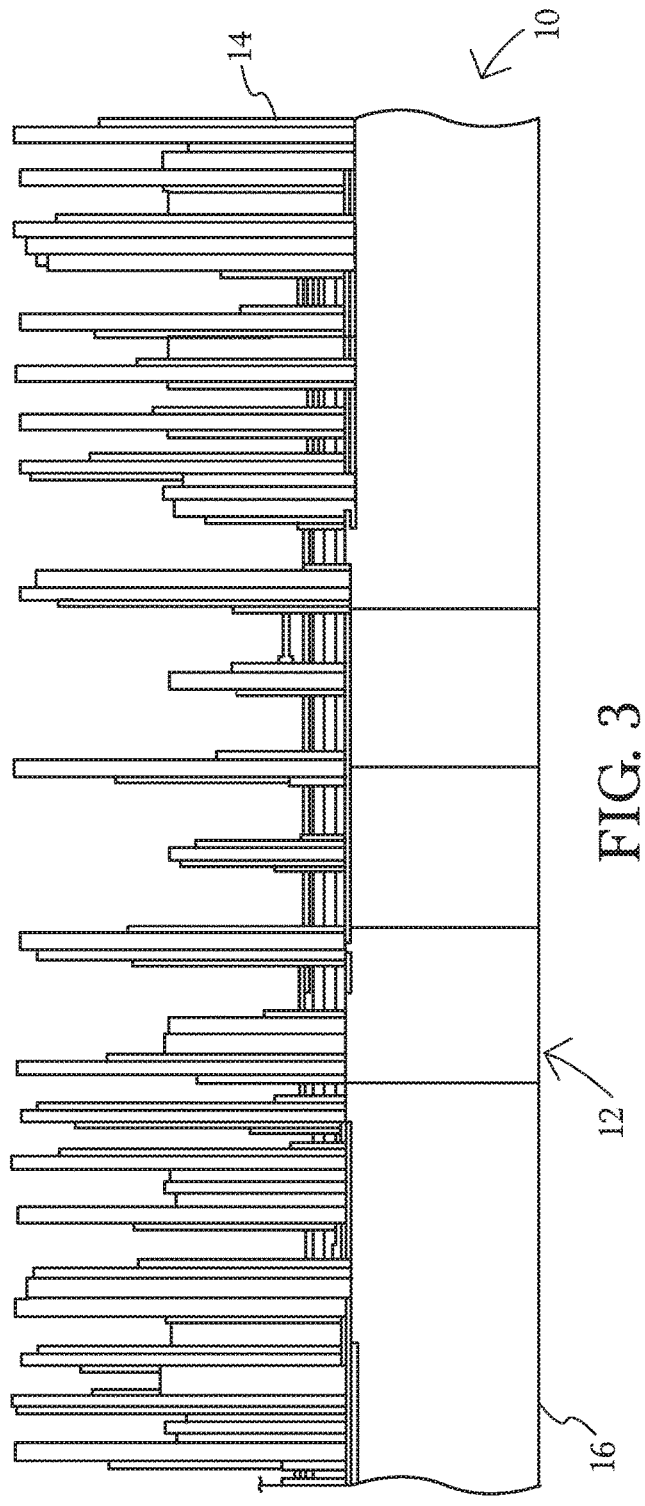
FIG. 3 is a front elevational view of the brush of FIGS. 1 and 2.
Figure 4:
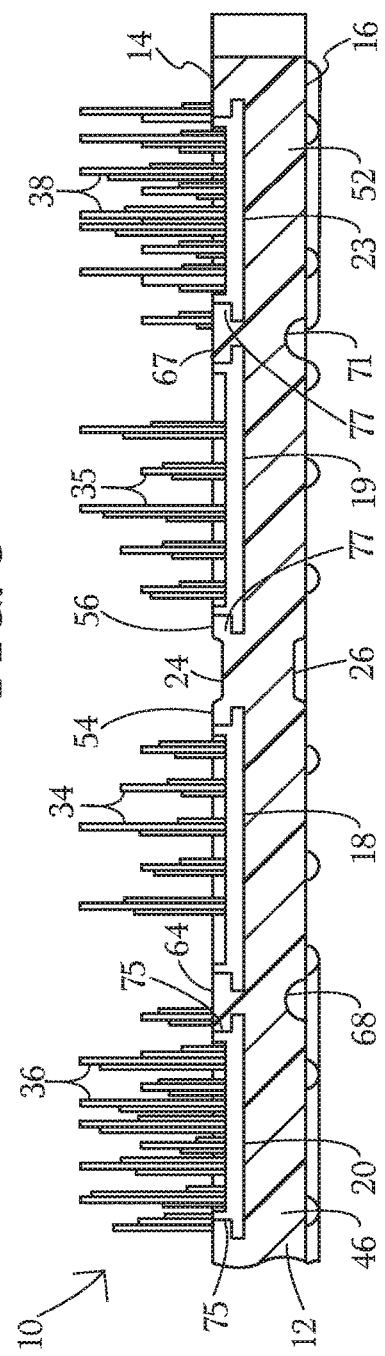
FIG. 4 is a cross-sectional view taken along line IV-IV in FIG. 1.
Figure 5:
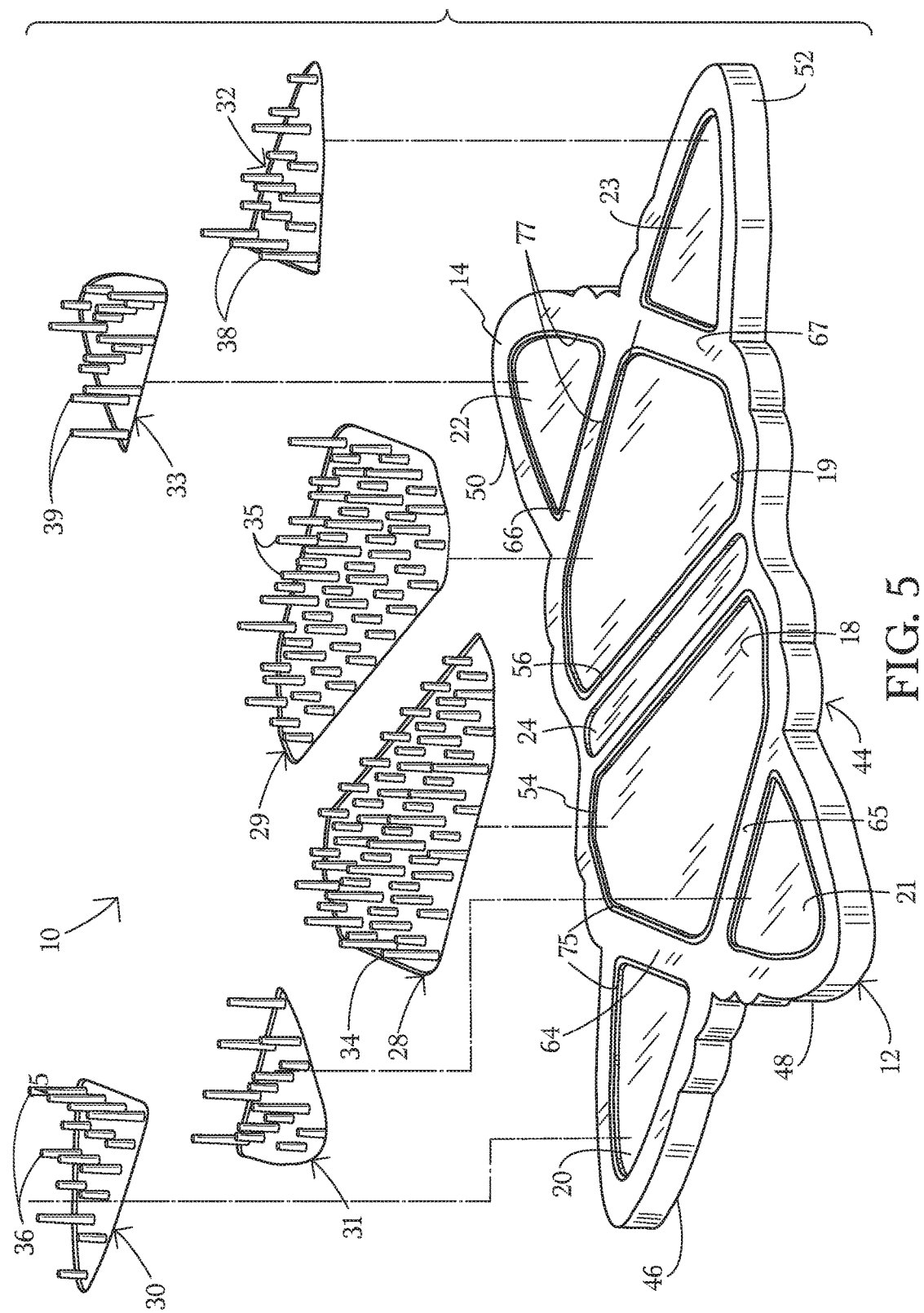
FIG. 5 is an exploded perspective view of the brush of FIGS. 1-4.

As depicted in FIGS. 1-5, a grooming tool 10 particularly for brushing the hair of animals such as long-haired dogs comprises a planar base member 12 having two major faces, a top face 14 and a bottom face 16. Base member 12 is formed with six shallow recesses 18-23 on top face 14. Two of the recesses 18 and 19 are medial recesses which are spaced from one another by an elongate area 24 of major face 14. Base member 12 is formed with at least one elongate groove or elongate indentation 26 on the major face 16. Groove or indentation 26 is opposed to and disposed in parallel relation to elongate area 24 and facilitates bending of base member 12 about an axis parallel to the groove or indentation.

Brush 10 further comprises six bristle plates 28-33 each mounted to base member 12 and seated in a respective one of the shallow recesses 18-23. Each bristle plate 28-33 is provided along one major surface (not designated) with a multiplicity of prongs or tines 34-39. Bristle plates 28-33 are substantially rigid at room temperature, while base member 12 is made of a material substantially more flexible at room temperature than the bristle plates.

Figure 8:
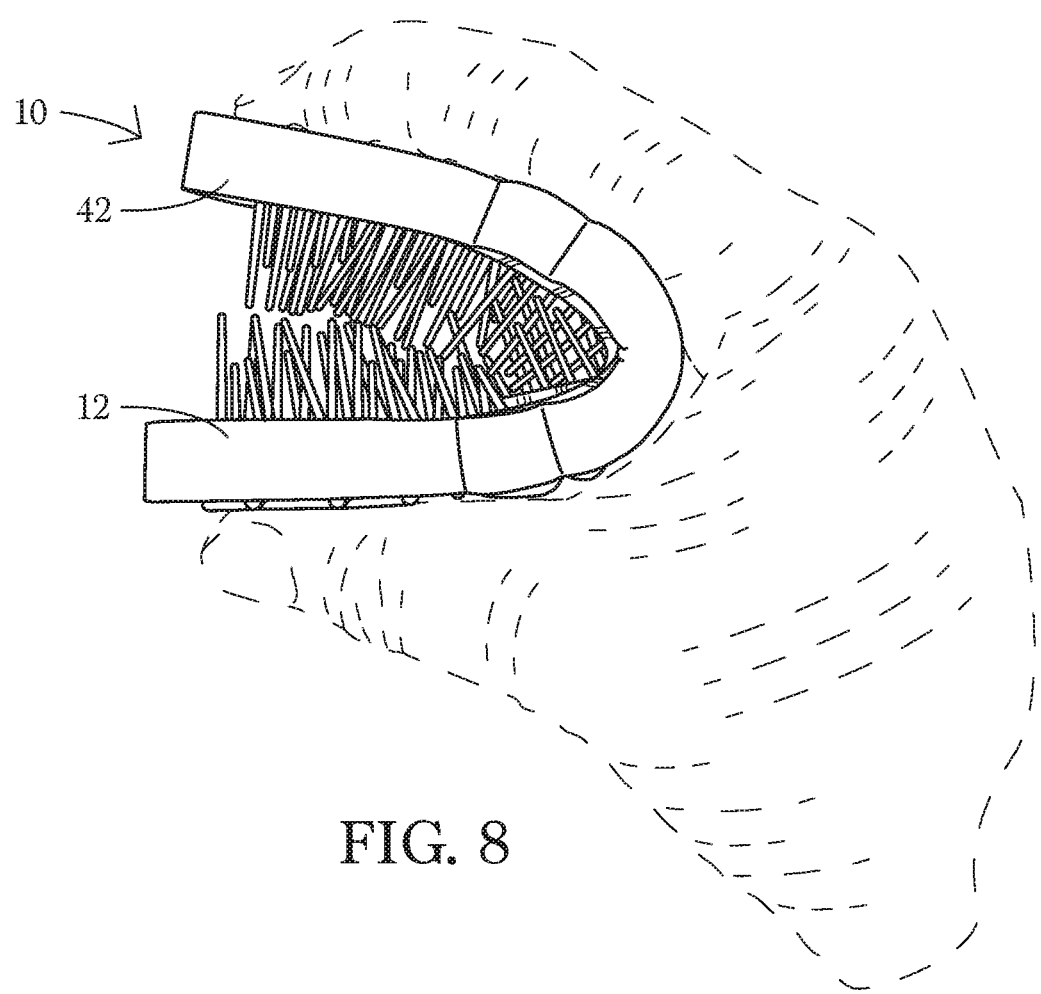
FIG. 8 is a side elevational view of the brush of FIGS. 1-5, showing the brush in a folded-over use configuration.

Base member 12 is capable of flexing under normal or moderate manually applied forces. For example, when a user holds base member 12 in a hand with the fingers engaging major face or surface 16 on one side of groove or indentation 26 and the thumb engaging major face or surface 16 on the other side of the groove of indentation, the user can deform base member 12 into a folded over configuration (FIG. 8) wherein two mutually mirror-symmetric portions 40 and 42 of the base member are nearly parallel to one another and wherein the tines 34, 36, 37 of one portion 40 of the base member are interleaved or interdigitated with the tines 35, 38 and 39 of the other portion 42 of the base member. With this folded-over configuration one's efforts to remove tangles or knots in an animal's hair are facilitated. Some user's might also find the brush useful for untangling their own hair. Wavy ridges 43 (FIG. 2) provided on base member 12 allow the user's fingers to grip and have anchor points to hold the brush firmly and comfortably with out slipping in order to control the strokes.

Base member 12 includes a medial portion 44 bisected on the top face 14 by elongate area 24 and on bottom face 16 by groove or indentation 26. Base member 12 further includes a pair of mutually spaced first triangular lobes or ears 46 and 48 at one end of medial portion 44 and a pair of mutually spaced second triangular lobes or ears 50 and 52 at an opposite end of the medial portion. First triangular lobes 46 and 48 are angled away from one another in a direction outwardly from medial portion 44, while second triangular lobes 50 and 52 are likewise angled away from one another in a direction outwardly from medial portion 44. Shallow recesses 18-23 include four triangular recesses 20-23 each disposed in a respective one of the triangular lobes 46, 48, 50, 52 on major face 14 of base member 12.

The two recesses 18 and 19 are medial recesses disposed on the medial portion 44 of base member 12 on opposite sides of elongate area 24. Each medial recess 18 and 19 has a respective first linear edge 54 and 56 juxtaposed to elongate area 24 and further has two shorter linear edges 58, 59 and 60, 61 juxtaposed to respective ones of the four triangular recesses 20-23. Bristle plates 28-33 include four triangular plates 30-33 mounted to base member 12 and seated in respective triangular recesses 20-23.

Hair brush 12 is mirror symmetric generally about elongate area 24 and specifically about an axis 62 passing centrally through elongate area 24, Accordingly, each triangular lobe 46 and 48 or 50 and 52 is juxtaposable in substantially parallel relationship with one of the other triangular lobes 50 and 52 or 46 and 48, allowing a more precise control by the user in removing tangles and knots. The bending usage of triangular lobes 46, 48, 50, and 52 makes it easier to reach the ears, whiskers and other parts of the animals' faces that are hard to reach with a normal brush or grooming tool. Triangular lobes 46, 48, 50, 51 may be additionally bendable towards one another. To that end, base member 12 exhibits, on major face 14, four additional elongate areas 64-67 each disposed between a respective one of the shorter linear edges 58-61 of medial recesses 18 and 19 and a respective one of the triangular recesses 20-23. Concomitantly, base member 12 is further formed on bottom major face 16 with four additional grooves or elongate indentations 68-71 each opposed to and aligned in parallel with a respective one of the four additional elongate areas 64-67 for facilitating or enabling a bending of base member 12 about respective axes parallel to the respective elongate areas 64-67 and the associated grooves or indentations 68-71. Grooves or indentations 68 and 69 are connected to, or communicate with, one another via an oval indent or recess 112, while grooves or indentations 70 and 71 are connected to, or communicate with, one another via an oval indent or recess 114. The oval indents or recesses 112 and 114 facilitate bending of lobes or ears 46, 48, 50, and 52.

Bristle plates 28-33 are held in respective recesses 18-23 on major face 14 of base member 12 by means of detents or lips 75, 77 each extending from the base member over an edge (94 in FIGS. 6 and 7) of a respective bristle plate 28-33. Bristle plates 28-33 are made of a polymeric thermosetting material that is flexible in an elevated temperature range, significantly higher than room temperature, to enable insertion of the bristle plates into respective recesses 18-33 and under detents or lips 68, 70.

Figure 6:
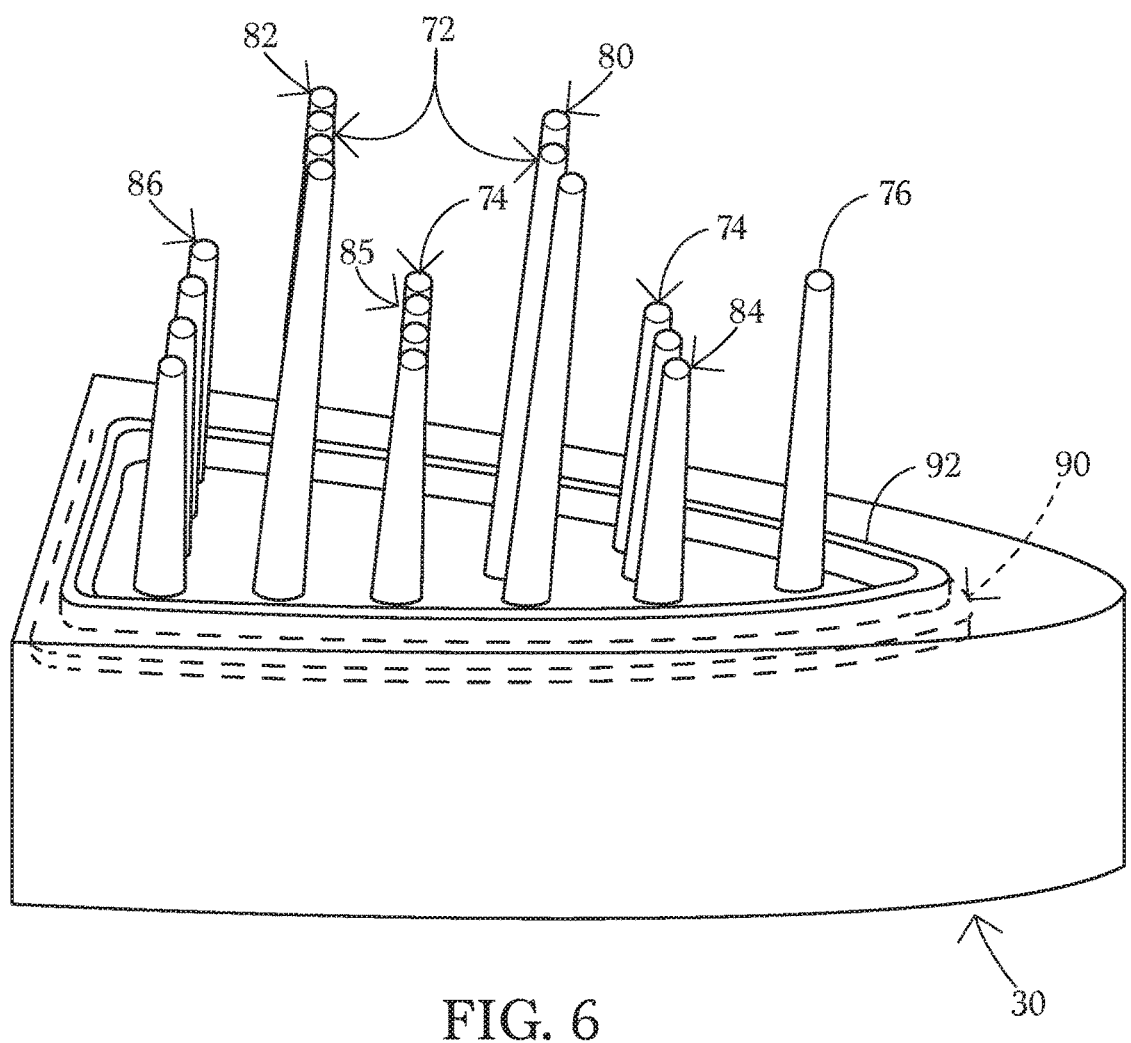
FIG. 6 is a perspective view of a bristle plate included in the brush of FIGS. 1-5.

As depicted in FIG. 6, each triangular bristle plate 30-33 (30 being representative) and thus each set of tines 34-39 includes first tines 72 (tall tines) all of a first length and second tines 74 (short tines) all of a second length less than the first length. In addition, each set of tines 34-39 includes a singular third tine 76 (apical tine) of an intermediate length between the length of the first tines 72 and the length of the second tines 74. Tine 76 is disposed at an apex 78 of the respective triangular plate 30-33, while the tall tines 72 include a first linear array 80 of mutually tines spaced from the apex and a second linear array 82 of mutually spaced tines disposed in parallel with and on a side of the first linear array 80 of tines opposite the apex 78. Short tines 74 include three straight rows 84, 85, 86 of tines with the first row 84 disposed between the single, apical, tine 76 and the first linear array 80 of tall tines. The second row 85 of short tines 72 is disposed between the first linear array 80 of tall tines and the second linear array 82 of tall tines. The third row 86 of short tines 74 is disposed on a side of the second linear array 82 of tall tines 72 opposite the apex 78. All of the linear arrays 80, 82 of tall tines 72 and straight rows 84, 85, 86 of short tines 74 are arranged in parallel. Each bristle plate 30-34 may comprise a base 90 and an upstanding endless flange 92 spaced slightly from an edge 94 of the base. During assembly of the brush 10, edges 94 of bristle plates 28-33 are inserted under inwardly projecting detents or lips 75, 77. The function of the shorter length tines is to make it safer to brush near the eyes, the nose and the mouth of the animal.

Figure 7:
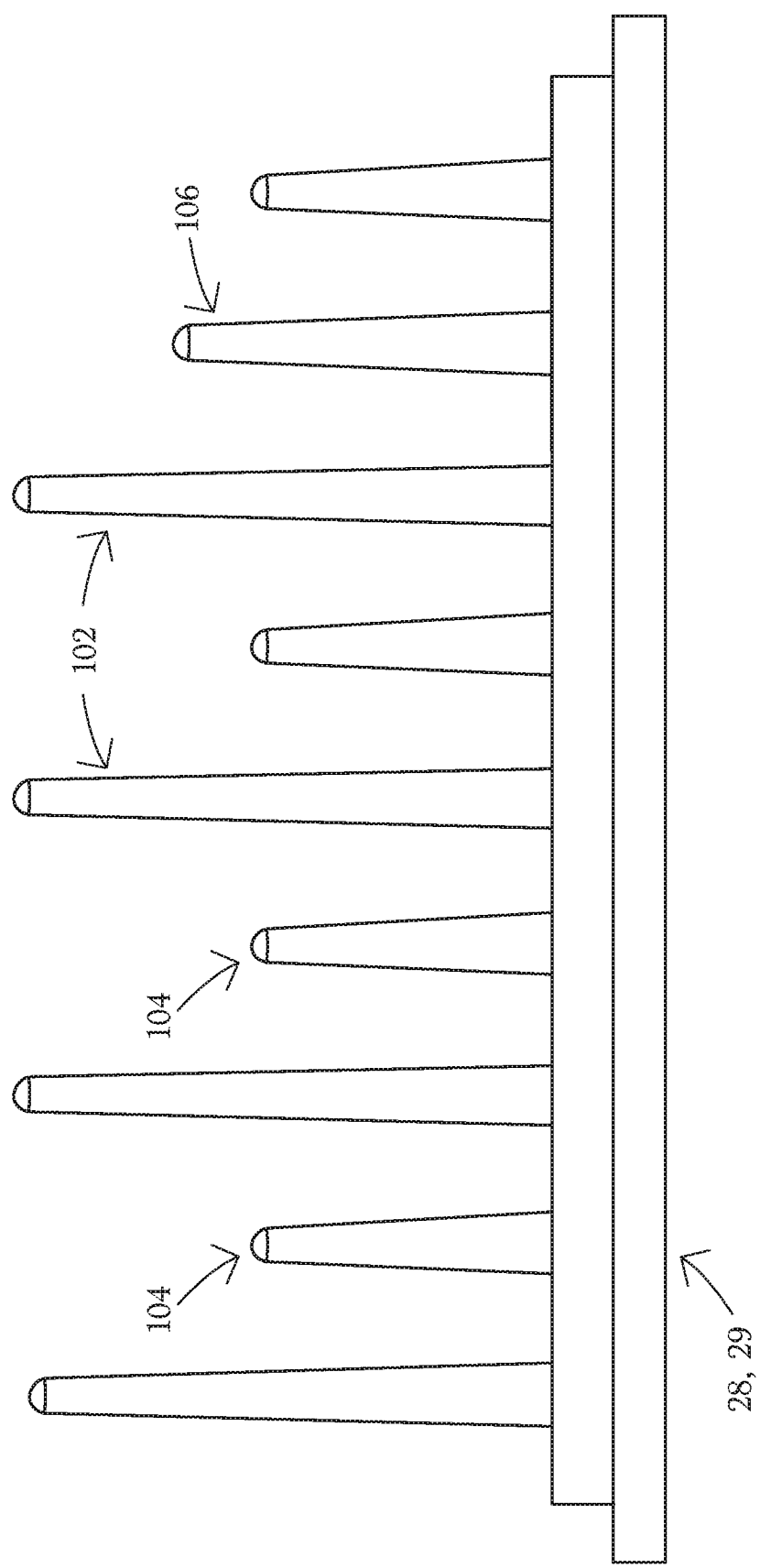
FIG. 7 is a side elevational view of another bristle plate included in the brush of FIGS. 1-5.

As depicted in FIG. 7, larger bristle plate 28 has 3 differently sized bristles or tines 102, 104 and 106. (Bristle plate 29 has the same distribution of tines in a mirror image array.) The reason that there are three differently sized tines 102, 104 and 106 in the middle two plates 28, 29 is to help the brush bend and to separate strands of hair. The side view of FIG. 7 shows middle plate 28 as having 9 rows or linear arrays of tines. Base plates 28 and 29 are generally triangular with respective base edges (not separately designated) extending along edges 54 and 56 of medial recesses 18 and 19. The first row of tines starting at the right proximate the base edge of plate 28 is short, then medium (2nd row), tall (3rd row), short (4th row), tall (5th row), short (6th row), tall (7th row), short (8th row) and tall (9th row at far left). It is the be noted that the 9th row (far left, farthest from the center of the brush) is preferably of medium height rather than the tall height illustrated to prevent bending.

Figure 9:
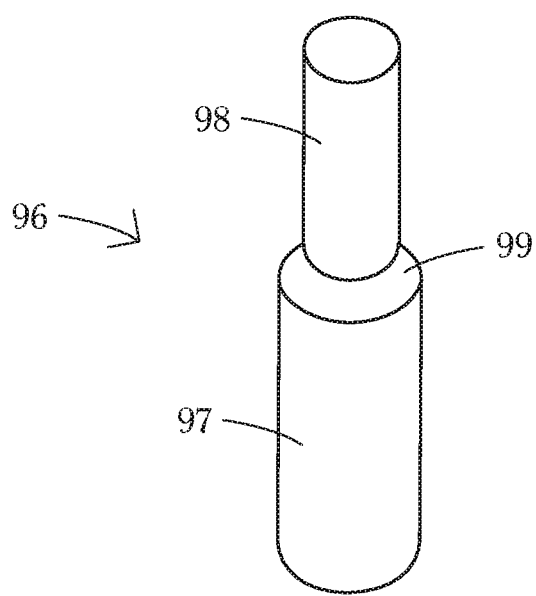
FIG. 9 is a side elevational view of a representative tine or bristle.

FIG. 9 depicts a possible bristle or tine 96. At least some of the tines 34-39 may have the structure of representative tine 90, that is, with a substantially rigid base segment 97 and flexible distal or free end segment 98. Base segment 97 is sufficiently rigid so as to not bend or deform during grooming or brushing, while free end segment 98 is sufficiently flexible to freely bend and deform during grooming. Base segment 97 may be thicker, with a larger diameter, than any portion of free end segment 98. In that event tine 96 may exhibit a shoulder 99 at a junction (not separately designated) between base segment 97 and distal or free end segment 98. Alternatively or additionally, the tines may have a gradual taper. In that case, base segment 97 may be made of a different material than that of distal or free end segment 98.

A method of manufacturing a hair brush as described hereinabove starts with molding a first thermosetting polymeric material to form planar base member 12 with its two major faces 14 and 16, its recesses 18-23, elongate area 24 raised relative to the two flanking medial recesses 18 and 19, the elongate groove or indentation 26. The method further includes molding a second thermosetting polymeric material to form bristle plates 28-33 with respective sets of bristles or tines 34-39 projecting from one side. Each bristle plate 28-33 is deformed while the bristle plates have an elevated temperature (e.g., 50-200° higher than room temperature). The deformed bristle plates 28-33 are inserted into the respective ones of shallow recesses 18-23 in base member 12. Thereafter bristle plates 28-33 are allowed to resume flat or planar configurations while seated in their respective recesses 18-23. The bristle plates 28-33 cool and assume a hardened configuration while lodged in the respective recesses 18-23.

A brush as described hereinabove can be used straight in a straightened configuration or, alternatively, in a bent or partially bent configuration to conform to the animal's body for brushing.

Variations and modifications in the herein described apparatus, method, and system in accordance with the invention will undoubtedly suggest themselves to those skilled in the art. For instance, the tines of any subset of tines 34-39 may be formed with balls at the free ends. In addition, base member 12 may be provided with a strap or band for holding the grooming brush to a user's hand.

What is claimed is:

1. A hair brush, comprising:
a planar base member having two major faces, said base member being formed with a plurality of shallow recesses on one of said faces, two of said recesses being spaced from one another by an elongate area, said base member being formed with at least one elongate groove or elongate indentation on the other of said faces, said groove or elongate indentation being opposed to and parallel with said elongate area; and
a plurality of bristle plates each mounted to said base member and seated in a respective one of said shallow recesses, each of said bristle plates being provided along one major surface with a multiplicity of tines, said bristle plates being substantially rigid at room temperature.

2. The brush defined in claim 1 wherein said base member includes a medial portion bisected on said one of said faces by said elongate area and on said other of said faces by said groove or elongate indentation, said base member further including a pair of mutually spaced first triangular lobes at one end of said medial portion and a pair of mutually spaced second triangular lobes at an opposite end of said medial portion, said first triangular lobes being angled away from one another in a direction outwardly from said medial portion, said second triangular lobes being angled away from one another in a direction outwardly from said medial portion, said shallow recesses including four triangular recesses each disposed in a respective one of said first triangular lobes and second triangular lobes on said one of said faces of said base member, said two of said recesses being medial recesses disposed on said medial portion of said base member on opposite sides of said elongate area, each of said medial recesses having a first linear edge juxtaposed to said elongate area and further having two shorter linear edges juxtaposed to respective ones of said four triangular recesses, said bristle plates including four triangular plates mounted to said base member and seated in respective ones of said triangular recesses.

3. The brush defined in claim 2 wherein said bristle plates are held in the respective recesses on said one of said faces of said base member by means of detents or lips each extending from said base member over an edge portion of a respective one of said bristle plates.

4. The brush defined in claim 3 wherein said bristle plates are made of a thermosetting material that is flexible in an elevated temperature range, higher than room temperature, to enable insertion of said bristle plates into respective ones of said shallow recesses and under said detents or lips.

5. The brush defined in claim 2 wherein said base member exhibits, on said one of said faces, four additional elongate areas each disposed between a respective one of said shorter linear edges of said medial recesses and a respective one of said triangular recesses, said base member being further formed on said other of said faces with four additional grooves or elongate indentations each opposed to and parallel with a respective one of said four additional elongate areas.

6. The brush defined in claim 2 wherein each of said triangular plates includes first tines all of a first length and second tines all of a second length less than said first length and a single third tine of a third length intermediate said first length and said second length, said third tine being located at an apex of the respective one of said triangular plates, said first tines including a first linear array of mutually spaced tines spaced from said apex and a second linear array of mutually spaced tines disposed on a side of said first linear array of tines opposite said apex, said second tines including three straight rows of tines with a first row disposed between said third tine and said first linear array of mutually spaced tines, a second row disposed between said first linear array of mutually spaced tines and said second linear array of mutually spaced tines, and a third row on a side of said second linear array of mutually spaced tines opposite said apex.

7. The brush defined in claim 1 wherein at least some of said tines have substantially rigid base segments and flexible free end segments.

8. The brush defined in claim 7 wherein said base segments are sufficiently rigid as to not bend or deform during grooming or brushing, said free end segments being sufficiently flexible to freely bend and deform during grooming or brushing.

9. The brush defined in claim 7 wherein said base segments are thicker, with a larger diameter, than any portion of said free end segments.

10. The brush defined in claim 1 wherein said bristle plates are made of a thermosetting material that is flexible in an elevated temperature range, higher than room temperature, to enable insertion of said bristle plates into respective ones of said shallow recesses.

\* \* \* \* \*